United States Patent [19]

Daudin et al.

[11] Patent Number: 4,809,294
[45] Date of Patent: Feb. 28, 1989

[54] ELECTRICAL MELTING TECHNIQUE FOR GLASS

[75] Inventors: Philippe Daudin; Pierre-Emmanuel Levy, both of Paris; Jean-Yves Aube, Clermont; Bernard Duplessis, Liancourt; Marcel Boivent, Neuilly sur Seine, all of France

[73] Assignee: Saint-Gobain Recherche, France

[21] Appl. No.: 59,582

[22] Filed: Jun. 8, 1987

[30] Foreign Application Priority Data

Jun. 6, 1986 [FR] France .................. 86 08232

[51] Int. Cl.⁴ .......................................... C03B 5/027
[52] U.S. Cl. ........................................ 373/41; 373/36
[58] Field of Search ................. 373/27, 29, 30, 33, 373/41; 65/DIG. 4

[56] References Cited

U.S. PATENT DOCUMENTS

| | | | |
|---|---|---|---|
| 2,591,708 | 4/1952 | Lubatti | 373/41 |
| 3,877,917 | 4/1975 | Hohman . | |
| 3,912,486 | 10/1975 | Jauch . | |
| 3,983,309 | 9/1976 | Faulkner et al. | 373/36 |
| 4,036,625 | 7/1977 | Holmes . | |
| 4,107,450 | 8/1978 | Costin | 373/30 |
| 4,607,372 | 8/1986 | Martin et al. | 373/41 |

Primary Examiner—Roy N. Envall, Jr.
Attorney, Agent, or Firm—Oblon, Fisher, Spivak, McClelland & Maier

[57] ABSTRACT

An electrical melting technique for glass, more specifically, a technique wherein the conductivity of the molten glass is used to develop the energy necessary to melt the raw materials. Energy is dissipated by a Joule effect into the molten mass from vertical plunging electrodes, with the composition to be melted being spread in a uniform layer on the surface of the bath. The electrodes are arranged at a distance from the refractory walls of the tank, with the distance separating the electrode from the closest lateral wall being at least half that separating two adjacent electrodes and the position of the level of the maximum temperature being regulated by the depth of immersion of the electrodes.

20 Claims, 5 Drawing Sheets

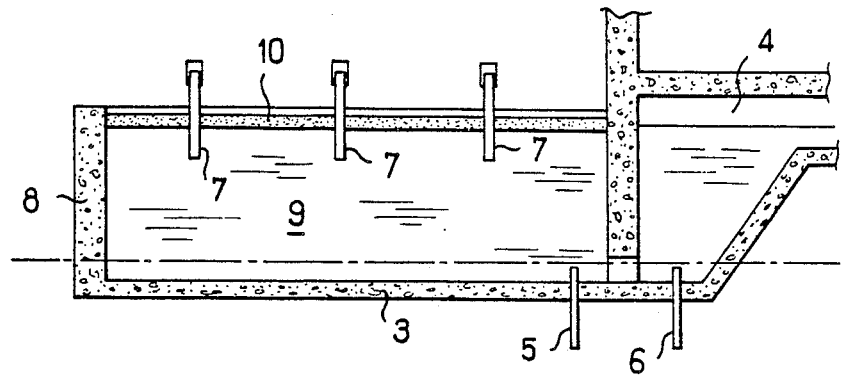
FIG_1
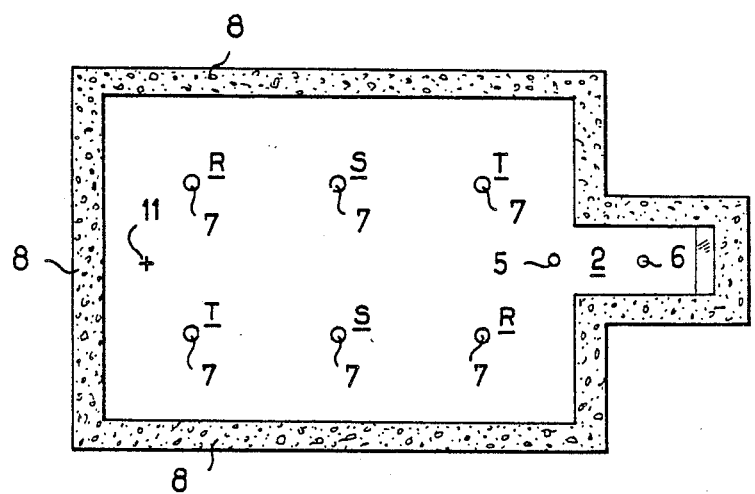
FIG_2

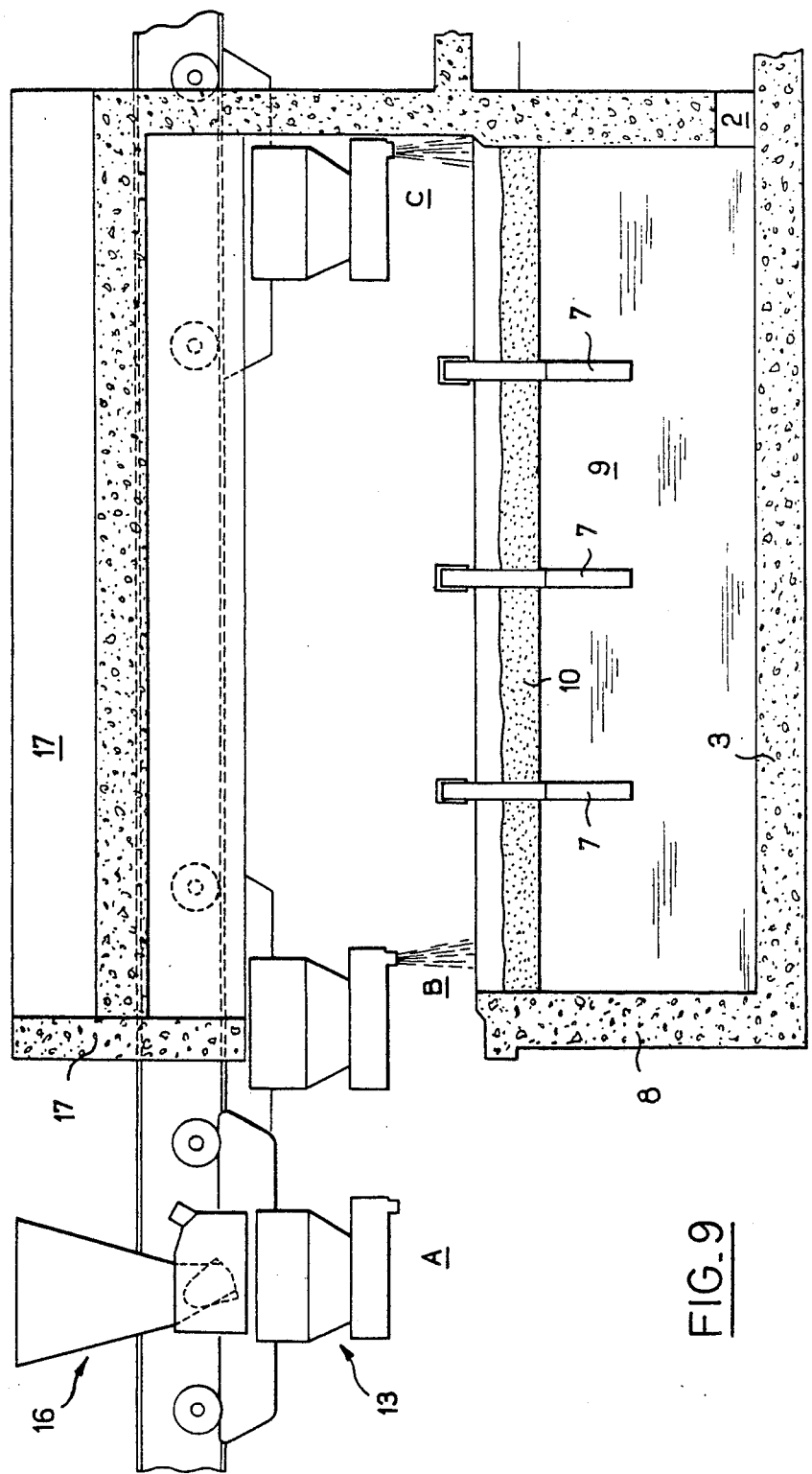

ELECTRICAL MELTING TECHNIQUE FOR GLASS

BACKGROUND OF THE INVENTION

1. Field of the Invention

The invention relates to electrical melting techniques for glass and, more specifically, to those wherein the conductivity of the molten glass is used to develop the energy necessary to melt the raw materials.

2. Discussion of the Background

For a long time, installations for high volume glass production have been equipped with melting furnaces using fossil fuel and gas in particular. This is particularly the case for high capacity, continuous production installations which produce, for example, flat glass or glass for bottles. When electrical energy was used in those large furnaces, it was basically used locally to maintain the temperature of the glass in the less hot zones or outside the furnace along the glass' path to its transformation area or, even, to develop certain convection movements which supposedly assist the homogenization, the refining or the movement of the molten material.

Electrical melting per se first appeared on small units for which high flexibility in use seemed necessary. Fluctuations in energy costs and the progressive mastery of certain technological problems have led more recently to the development of high production units in which the entire melting process, except for the start-up, takes place using electrical energy. This development requires solving extremely delicate technological problems.

Consequently and particularly in order to avoid the question of oxidation of the electrodes at the surface of the melting bath, it has been proposed to immerse them completely. This is the solution adopted in the French patent No. FR-A-2 552 073. In this document, the electrodes are arranged vertically in the bath from the floor of the furnace. In other embodiments, there are also electrodes passing through the lateral walls of the furnace.

Independent of the advantages it offers with respect to corrosion problems, immersion of the electrodes also provides a convenient and very uniform supply of raw materials to the surface of the bath. The constitution of a relatively thick layer of composition to be melted, floating on the molten bath, is in effect useful for several reasons. On contact with the molten bath, it forms a permanent reserve of material necessary for continuous operation. It also protects the molten bath from high caloric depletion through convection on contact with the atmosphere and, in particular, through radiation.

While the furnaces of the type described in the above-identified document have very considerable industrial applications, they do not necessarily respond in the best manner to all requirements encountered in practice. By way of example, it is desirable, in certain cases and with an obvious aim of limiting investment costs, to transform the installations using burners by retaining as many as possible of the existing elements and in particular the refractory materials constituting the tank. Such a transformation is not possible when electrodes are to be implanted in the floor or the lateral walls of the furnace.

The furnaces whose electrodes are immersed offer limited possibilities for regulating the electrodes. While they provide completely satisfactory results for a certain regimen, they adapt less well to frequent and/or substantial modifications to this system of operation.

In addition, even if the technology of immersed electrodes is now well developed and a life span for the electrodes which is comparable to that of the refractories can be foreseen, the possibility of premature deterioration of one or several electrodes, which would compromise good operation, cannot be completely ruled out.

SUMMARY OF THE INVENTION

One object of the invention is to provide an electrical furnace which can be installed using part of the elements of a conventional furnace with burners.

A further object of the invention is to provide an electrical furnace which enables varied operating regimens while maintaining a satisfactory heat yield.

In particular, the invention provides a melting furnace whose impedance can vary considerably in order to take into account modifications in the nature of the glasses produced or in order to change the rate of production. The invention also proposes handling glasses which are considered to have high resistivity.

A further object of the invention is to provide a melting process which ensures that, whatever the operating regimen used, wear of the refractories is minimized.

A further object of the invention is to provide a process which enables the use of tanks composed of relatively conductive refractory materials without altering the performances of the furnace.

A further object of the invention is to provide a process which allows a change of regimen without interruption and in a very short period of time.

In order to achieve these objects and others which will be indicated below, the invention proposes carrying out electrical melting by a Joule effect. In a melting furnace in accordance with the invention, the electrodes are arranged such that the temperatures at a same level are very uniform except for the areas situated in immediate proximity to the walls, which are preferably kept at a lower temperature. In addition, the position of the electrodes can be modified, in order to regulate the temperature gradient established in accordance with the vertical direction, as a function of the selected regimen.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic longitudinal cross-section of an electrical melting tank in accordance with the invention.

FIG. 2 is a cross-sectional view from above at the level of the mouth of the tank of FIG. 1.

FIG. 9 is a view of a method of distribution of the composition of raw materials in a furnace in accordance with the invention.

DETAILED DESCRIPTION OF THE PREFERRED EMBODIMENTS

Figure 3:
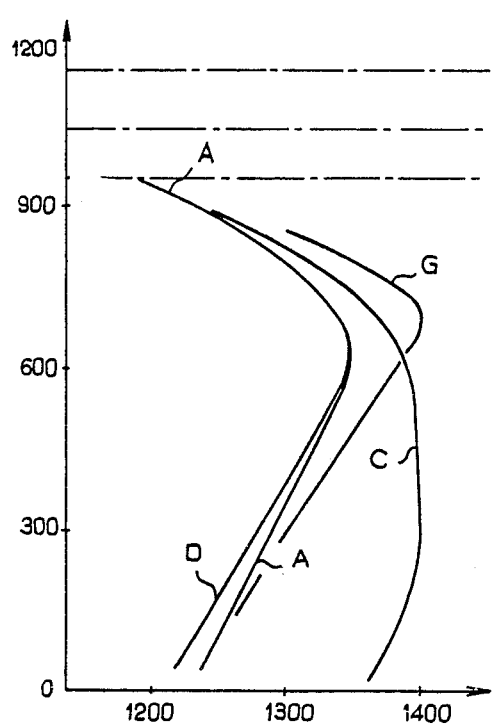
FIG. 3 is a graph showing the temperature gradient obtained as a function of the level which is present in the tank in different modes of operation.

In order to permit the use of previously constructed tanks to operate with the burners, the inventors were led to choose the solution consisting of plunging the electrodes into the bath through the free surface thereof. Experience has shown this arrangement to have a certain number of advantages with respect to ease of operation and also with regard to the performances of such furnaces.

The fact of introducing the electrodes through the free surface of the bath obviously overcomes the difficulties connected with the passage of said electrodes through the refractory, particularly the delicate problems of replacement of worn out electrodes, of sealing or of wear of the refractories.

This latter problem is posed particularly in the case of vertical electrodes arranged on the floor. In such case, increased erosion of the refractory occurs in the zone situated at the foot of the electrode, which is not without risk to the life of the furnace. To overcome this type of disadvantage, steps are generally taken to increase the resistance of this area by, for example, placing the electrode on a base forming a protuberance on the floor. This type of solution, however, is not completely satisfactory because it does not directly address the cause of the erosion and, independent of the disadvantage of wear of the refractories insofar as the life of the furnace is concerned, the modification of the composition of the molten material by the inclusion of components torn from the refractory walls can cause quite a problem. The content of these components is very small in relation to the rest of the molten bath but they are frequently the cause of a lack of homogeneousness of the material prepared as they are inadequately "digested".

This type of difficulty is particularly sensitive, for example, in the furnaces used for melting glass intended to provide so-called "textile" or reinforcement fibers. For this application, it is necessary to have a material which is free of unmelted particles. The presence of such particles would cause extremely bothersome "breaks" during the formation of the fibers. For this reason, the production of the glass is preferably carried out in a tank, the refractory material of which tends not to form unmelted inclusions. For this reason, the use of zirconia-based refractories is to be avoided and, for example, chromium oxide-based refractories are used. Such refractories have considerable conductivity at the working temperatures in question. Consequently, there is no question of placing the electrodes in contact with, or even in proximity to, the refractory material. The embodiments provided in accordance with the invention enable these delicate problems to be overcome.

A similar question arises with furnaces used for the production of glass for bottles. In such furnaces, one part of the starting material is composed of recovered glass bottles. Although it is sorted, this recovered glass often contains metal components which come from the closure crowns. The introduction of metallic particles ends up by forming a melted conductive layer on the bottom of the bath, which can short circuit the electrodes when they rest on the bottom. This problem is also overcome in the methods of construction in accordance with the invention.

The detailed study of erosion phenomena in the case of immersed electrodes has enabled the inventors to precisely determine the conditions of operating the melting techniques from among the most appropriate ones. Thus, it appeared desirable to limit the presence of inverse temperature gradients or, in other words, the formation of high temperature zones in proximity to the floor. In effect, in that case and in addition to the temperature itself which promotes the attack of the refractory, powerful convection currents are developed in the bath on contact with the floor, which further accelerate erosion. For this reason and in accordance with the invention, it has been attempted to localize the hottest zones at the upper part of the molten bath, with the exception of what is developed below with regard to the modifications in regimen.

The use of plunging electrodes enables the surface of the material in fusion to be maintained at the highest temperatures when necessary, and in particular, for strong drafts. For this, it is appropriate to adjust the depth of immersion. Of course, a certain depth is necessary to have a sufficiently active electrode surface. In practice, in effect, it is appropriate to limit the densities of current used on the electrodes which, on the one hand provides better distribution of the energy released, and on the other hand, by reducing local overheating, slows down the wear of the electrodes. A certain latitude is, however, possible in that in order to prevent overly increasing the current density it is possible to increase the voltage used or the cross-section of the electrodes.

In addition to the fact that it prevents superfluous convection movements, the formation of a temperature gradient whose maximum is situated on the surface of the bath or close thereto enables an improvement to be achieved in the melting of the raw materials. The highest temperature is situated at the place where it is effectively required. Melting constantly requires a considerably higher temperature than that which is needed for the transformation of the molten material. Insofar as the maximum temperatures are fixed, in order for example not to risk deteriorating the electrodes or, even more their supports, it does without saying that the melting will be more rapid when the highest temperature is situated in immediate contact with the materials to be melted. As will be seen in the examples, this is translated by a particularly high production capacity per furnace surface unit. Contrary to the method using plunging electrodes, the depth of which is adjustable, it is possible to reduce the draft by lowering. The electrodes. The hottest zone is then at a distance from the surface. Overall, the floor temperature is maintained and the maximum temperature is situated lower. In this manner, convenient means are provided to modify the draft of the furnace by changing the temperature of the floor and, consequently, the temperature of the glass at the exit of the furnace. This flexibility of operation is highly appreciated in furnaces in which production requirements lead to large variations in draft.

The use of plunging electrodes in accordance with the invention is also an advantage when treating a glass which is "opaque" to infrared radiation.

For "transparent" glasses a considerable part of the fusion energy is transmitted to the raw materials by radiation. However, for the "opaque" glasses, for example the glasses containing a relatively high quantity of iron oxide, the radiation cannot be developed in the same manner. Consequently, the temperatures in the vicinity of the electrodes are higher than in the rest of the bath. The difference is all the more noticeable when the system of operation corresponds to a lower draft. The limitation of the effect of the radiation on the fusion of the raw materials when, as in the invention, the hottest zone is localized in the vicinity of the raw materials has the advantage of a lower specific consumption in relation to that of furnaces in which the electrodes are on the floor.

The establishment of the temperature gradient, which is mentioned above, presents still further advantages. In particular, heat losses through the walls can be limited in a very efficient manner. It will also be seen in the examples that the heat yield in accordance with the invention is very satisfactory, that is, that the amount of energy necessary per volume unit of molten material is relatively low, and this is so with very varied regimens.

In a continuous operation regimen, the presence of a temperature gradient such that the hottest zones are at the surface also provides advantages with regard to the quality of the molten material. Contrary to what is observed in melting tanks when the electrodes are fixed on the bottom or on the walls, the convection movements of the bath are reduced to the strict minimum. Violent movements of the material in the bath are prevented. While such movements tend to provide a certain homogeneousness of the temperature and of the compositional state of the overall bath, it takes place under average conditions which do not ordinarily correspond to what is required for use.

In the furnaces in accordance with the invention, the homogenization is only carried out by level. If drawing off is carried out at the base of the tank, the progression of the material is established uniformly from top to bottom outside of the convection movements which are limited to the upper layers. Under these conditions, the melted material exiting the furnace is to a large extent refined. Similarly, the temperature reached at the bottom of the furnace can be regulated so as to reduce the subsequent adjustments necessary at the moment of use of the molten glass.

When it is desired to provide a large difference in temperature between the upper and lower parts of the bath, it is preferable to limit the depth of immersion of the electrodes. When this depth is increased, a downward movement of the hottest zones and, simultaneously, a rise in temperature at the level of the floor are in effect noticed for the same draft. If it is desired to maintain the temperature of the floor constant while increasing the depth of immersion, the power dissipated and consequently the draft of the furnace must simultaneously be reduced.

This peculiarity is used to advantage in accordance with the invention when, for a given installation, it is necessary to considerably reduce or even stop production. In that case, the depth of immersion of the electrodes is increased and the power is decreased. This method of operation, on the one hand allows the floor temperature to be maintained at a sufficient value to prevent the material from setting in a mass and, on the other hand slows the melting of the surface layer or can even practically stop it. In effect, at the same time as the hottest zone is moved towards the base of the furnace, the temperature in contact with the layer of raw materials.

It is remarkable to note that, insofar as the distribution of the electrodes is carried out satisfactorily, even under these conditions of a reduced operating regimen, the heat yield decreases only in a very limited fashion.

On the other hand, when it is desired to increase the draft of the furnace, it can be advantageous to increase the depth of immersion. This enables greater electrical power to be dissipated without achieving excessive current densities in contact with the electrodes. In such a situation, however, while the heat yield is satisfactory, an increase is normally noted in the temperature of the molten glass at the level of the floor. With a strong draft and in order to limit the increase in temperature at the level of the floor, it can also be advantageous, while increasing the dissipated power, not to increase the depth of immersion but to change the configuration of the electrodes so that they offer a larger surface over an unchanged depth. This is obtained, for example, by increasing the diameter of the electrodes or even, for example, by providing them in the form of discs arranged horizontally in the bath. In this manner, it is possible to maintain a certain temperature gradient even with a high draft. In any event, this gradient will nevertheless be lower than the one established with low drafts.

The best arrangements of electrodes in the horizontal plane correspond to what is stated in the above-identified reference. The electrodes are evenly distributed over the entire free surface of the bath. For a triphased current supply, the electrodes are arranged in at least one ordered assembly of two equidistant rows of three electrodes. Each electrode in the first row is supplied on one of the phases R, S, T of the current. The electrodes of the second row are in the reverse order T, S, R, such that the two middle electrodes are in phase while the end electrodes are on different phases. The distance separating the two rows of electrodes is approximately equal to that separating two electrodes of a same row.

The above-indicated arrangement can be completed by the addition of further rows of electrodes arranged in accordance with the same principles described in the above-identified reference.

The even distribution of the electrodes very obviously promotes the homogeneousness of the temperatures even in the zone corresponding to the immersed part of the electrodes. In this zone, the temperature is considerably higher in the immediate vicinity of the electrodes, but the differences with the surrounding molten bath are very rapidly attenuated such that it can approximately be considered that this upper layer is at a very uniform temperature. This is confirmed by temperature measurements at given levels in the production examples.

It is remarkable that temperature uniformity is established even in zones which are not situated between exchanging electrodes. The parts of the bath situated between the electrodes and the lateral walls reach temperatures which differ relatively little from those of the more "central" zones. The temperature is only considerably lowered on contact with the walls. The uniformity in temperatures which results from this distribution of electrodes is also a factor which guarantees a good heat yield.

On the other hand, electrodes situated along the walls could lead to equally uniform temperatures, but would have the disadvantage, on the one hand of considerably increasing heat losses, and, on the other hand of causing very rapid erosion of the refractories situated close to the electrodes for the reasons which were mentioned above, which are: considerable rise in temperature and increase in convection movements along said walls. Moreover, as indicated previously, the presence of electrodes close to the walls would effect the choice of the refractory materials forming the melting tank. It would be difficult to use conductive refractories.

For the reasons just given, the electrodes in the embodiments in accordance with the invention are maintained at a certain distance from the lateral walls. In conventional operating conditions, particularly with slightly or average resistive glasses, this distance is preferably not less than half the distance which separates two adjacent exchanging electrodes. This distance is preferably on the same order of size as that corresponding to the distance separating two adjacent electrodes.

The distances in question above are those corresponding to the most common glasses of the silico-soda-lime type in which the alkaline content is relatively high. The distance between the exchanging electrodes can also be further reduced when more resistive glasses are treated and, in particular, those intended to form reinforcement fibers, the alkaline content of which is substantially lower. For such glasses the distance from the electrodes to the walls of the furnace can be greater than with the less resistive glasses.

In general, while respecting the electrode-wall distance conditions which have just been mentioned, it can be advantageous in accordance with the invention to modify the distances between electrodes as a function of the condition of the treated material. It is a matter not only of taking into account the resistivity of the glass when the production regimen is achieved but also, as appropriate, of adapting the configuration of the melting assembly to the specific conditions corresponding to its start-up. In this latter case, it can be advantageous to start the melting with the electrodes close to one another, with the distance being progressively increased as the melting of the materials progresses.

The distribution of the electrodes in the manner just described involves a specific arrangement of the furnace. It could simply be envisaged to introduce the electrodes through holes provided in the refractory roof which covers the melting bath. This solution, however, allows neither the movement of the electrodes at the surface of the bath nor a fully uniform supply of raw materials. Whatever the means of supply used, they must cover the entire surface with as even a layer as possible of a pulverulent composition during the entire period of operation of the furnace. The presence of electrodes, or of electrode supports, passing through the roof is an obstacle to the movement of the means for distributing the composition. For these reasons, in accordance with the invention, the electrodes are fixed on supports which overhang the melting tank from the sides thereof. The means for distributing the composition are arranged in such a manner that they pass above the electrodes and their supports.

While the layer of composition deposited on the surface of the bath in fusion constitutes protection against heat losses, it is, however, preferable to arrange a refractory roof over the bath. The presence of a roof is particularly useful in the start-up or reduced output phases, during which the protective layer of raw materials is either not present or has a very reduced thickness. In the arrangement in accordance with the invention, this means that the electrode supports are arranged between the lateral refractory walls of the tank and the roof.

It goes without saying that the space separating the vertical walls of the tank and the roof is preferably as small as possible in order to limit heat losses. It has, moreover, been seen that the electrodes must be able to be changed very rapidly, either to replace a worn out element or to modify the configuration of the immersed part of the electrode, for example, to modify the length of the electrode. These two conditions combined require that the electrode supports are movable on the one hand and, on the other hand, that the movement of the electrode support, to remove it from the area defined by the tank and the refractory roof, can take place in a restricted space.

Referring now to the drawings, wherein like reference numerals designate identical or corresponding parts throughout the several views, the tank shown in longitudinal cross-section in FIG. 1 and viewed from above in FIG. 2 is of a generally conventional shape for tank furnaces operating in particular with burners. The tank is composed of refractory materials. Its dimensions are variable. They are a function of the planned size of production. It will, however, be seen that the furnaces in accordance with the invention enable high specific drafts to be achieved. In other words, for a given draft, the surface of the furnaces can be relatively small. It is also important to point out that the method of heating the furnace in accordance with the invention allows, without major disadvantages and in particular without the specific consumption being overly modified, operation at possibly very reduced regimens in relation to the nominal drafts.

The depth of the tank is comparable to that conventionally selected for this type of furnace. A minimum depth is preferable to appropriately develop the vertical temperature gradient and enable the direct recovery at the bottom of the tank of relatively well-refined glass. Such a minimum can be fixed at approximately 500 mm of molten material. The possibility in accordance with the invention of modifying the depth of immersion of the electrodes in large quantities enables, as appropriate, deeper tanks than normal to be used, for example tanks in which the height of the molten bath exceeds 1500 mm.

In the embodiment shown, the molten material is removed through a mouth 2 located on one side of the tank and at the same level as floor 3. Further, in said embodiment, mouth 2 communicates directly with "feeders" or pre-furnaces 4 which take the molten material to the various transformation locations.

Priming charge electrodes 5 and 6 are arranged close to or in the mouth on the floor. These electrodes can be used to maintain the material in fusion when the draft is stopped or greatly reduced and to prevent the small quantity of material kept in the mouth from setting.

Additionally, electrodes 5 an 6 can also be used to adjust the temperature of the drawn-off material. In the normal operating regimen, it is not necessary to supply these electrodes.

In all cases, when such electrodes are present on the floor, the power dissipated at that level is always very limited in comparison to that used for melting using the plunging electrodes, such that wear phenomena are negligible. For example, the highest power dissipated at the level of electrodes 5 and 6 does not exceed 1/20 of that used by the six plunging electrodes of the example shown.

In the embodiment shown in FIG. 1, the floor is horizontal. This is the most common shape in tank furnaces. This shape is even practically necessary when using electrical melting with electrodes arranged on the floor and when attempting to obtain highly uniform heating. In the case of plunging electrodes, the floor configuration is practically independent of this question. Consequently, it is possible, for example, to provide a floor which is sloped slightly in the direction of the removal mouth. It is also possible to arrange the output at any point whatever of the floor, particularly at the center of the furnace.

In the example of FIGS. 1 and 2, there are six plunging electrodes. They are preferably supplied with triphased current and the distribution of the phases (R, S, T) is as shown in FIG. 2. This arrangement provides a good balance of the phases and a highly uniform dissipation of the energy over the entire area of the molten bath.

The plunging electrodes 7 are, moreover, evenly spaced such that each one is located substantially in the center of a zone of the bath, with each zone being of the same size. This arrangement places the electrodes 7 at a good distance from the lateral refractory walls 8. The instance separating two adjacent electrodes, in the example shown, is on the order of that separating the electrode from the closest wall 8. As indicated above, it can be less but, preferably, the wall-electrode distance is not less than half of that between two adjacent electrodes.

The number of electrodes used depends on the surface area of the furnace and, consequently, on its draft. For higher capacity furnaces the arrangement of the electrodes in triphased current is preferably that described in the above-mentioned application. In particular, it is possible to use the invention with furnaces whose configuration corresponds to double the length of the tank, which is the equivalent of placing end-to-end two units such as that shown. Other configurations are, of course, possible but require specific arrangements with regard to the electrode supports in relation to the embodiments exemplified below.

FIG. 1 further shows the molten bath 9 covered with a continuous layer of raw materials 10. This layer, which is as uniform as possible, can be more or less thick depending on the operating regimen. In operation, a minimum on the order of a thickness of 100 mm is preferably maintained so as to thermally isolate the bath in fusion from the atmosphere. A greater thickness may be preferred but, in practice, a thickness of 300 mm, which would have no advantages and could lead to considerable irregularities in thickness as a function of the preferred melting zones, should not be exceeded.

As indicated in FIG. 1, the electrodes 7 pass through the surface layer of raw materials and penetrate into the molten bath. The depth of immersion depends principally on the draft at which the system is operated and also on the current density at the surface of the electrode. For a strong draft, a compromise has to be made between the advantage constituted by surface heating with low immersion and the need to maintain the current density within technologically acceptable limits. For such strong drafts, the depth is preferably maintained at less than $\frac{2}{3}$ of the depth of the bath and even preferably at less than half of said depth.

When the draft is reduced, as indicated above, it may be preferable to move the hottest zones to deeper levels. In this case, the electrodes can plunge preferably to mid-depth or even more, for example up to $\frac{3}{4}$ thereof.

For example, for a same furnace and a same arrangement of electrodes and for a draft of 3 tons per day per $m^2$ of tank, the electrodes are plunged to one-third of the depth of the bath, whereas for a draft limited to 1 ton, it is preferable to plunge the electrodes to $\frac{3}{4}$ of the depth.

In all cases, the immersed surface of the electrode must be compatible with the supportable current densities, without wear being too great. In practice, electrodes are selected with a diameter sufficient to overcome this restriction.

FIG. 3 shows how the temperature gradient is established in the previously described tank for a regimen of production of 1.5 tons per square meter per day. The temperature is measured systematically at the different levels.

On this graph, the layer of raw materials and the level of molten material in the pre-body are represented by broken horizontal lines. In the example being studied the thickness of the layer of composition corresponding to the two broken lines which are farthest from one another is approximately 200 mm.

The temperature curve A corresponds to the measurements carried out vertically from point 11 on FIG. 2. Curve G is established for a vertical situated at 100 mm from an electrode S for the same operating conditions.

In a first approximation, it can be considered that these two curves represent the two extreme temperature limits observed for each level for a same regimen.

For these two curves the depth of immersion is slightly less than one-third of the depth of the bath.

The first characteristic of these curves is that the temperature is higher close to the electrode. The difference is greatest in the highest zone and is attenuated closer to the floor. The difference in temperature which exists at this level is essentially due to the more "central" location of the point of measurement in proximity to electrode S which, therefore, is less subject to cooling by the walls than in the other case.

A second characteristic is the fact that these curves, with the exception of the upper part of the bath in immediate contact with the composition to be melted, show an even decrease in temperature from top to bottom. The difference between the maximum and minimum temperatures on a same vertical reaches approximately 200° C.

In the example being considered, the maximum temperature for the least hot zones corresponds to curve A which is situated approximately at a depth corresponding to the end of the electrodes. In the hottest zones (curve G), the maximum is situated slightly closer to the surface layer.

Curve C corresponds to curve A when the electrode is plunged to $\frac{3}{4}$ of the depth of the bath. In this case, a very substantial increase is noted in the maximum temperature in relation to the preceding one. This maximum remains practically equal over a large part of the height of the bath. The temperature at the floor level is increased by more than 100° C. Such a deep immersion is interesting for a more reduced draft. In this case, the dissipated power is reduced and, correspondingly, so is the furnace draft and the temperature of the floor level can also be brought to the value of curve A.

Temperature profile C is close to that observed with similar furnaces in which the electrodes are placed in the floor.

Figure 4:
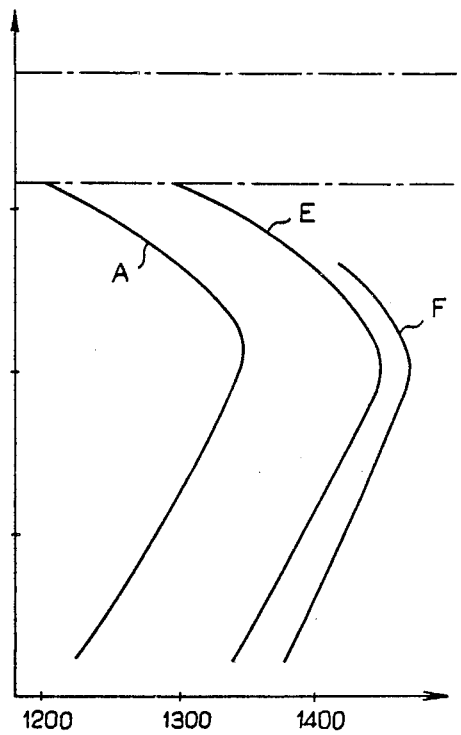
FIG. 4 shows the result of the temperature measurement for different draft conditions.

It is interesting to compare these curves to those of FIG. 4 which illustrates the same temperature profiles for different drafts (curve E approximately 2.4 tons per day per m², curve F approximately 3 tons). In these examples, the immersion is the same as that corresponding to curve A.

A general increase in temperature is noted as a function of the draft. It is, however, remarkable that by maintaining the electrode in the high part of the bath, the draft can be practically doubled by obtaining a temperature at the floor level which is comparable to that measured in the case of curve C. This fully illustrates the advantage of limiting the depth of immersion.

On FIG. 3, curve D corresponds to a measurement similar to that of curve A for a more "opaque" glass. The glass in question has an iron oxide content of 0.60, and that of curve A is 0.20. The presence of this oxide causes high absorption of the infrared radiation. The comparison of curves A and D shows a relatively small influence of the more or less "opaque" character of the treated glass. In particular, the temperature at the level of the layer of raw materials and the maximum temperature are practically unchanged, while the temperature of the floor is lowered by approximately 20° C. On the other hand, for the furnaces in which the electrodes are planted on the floor, it is known that an increase in iron oxide content requires a considerable increase in the maximum temperature and in the temperature of the floor in order to maintain the temperature on contact with the surface layer.

Figure 5A:
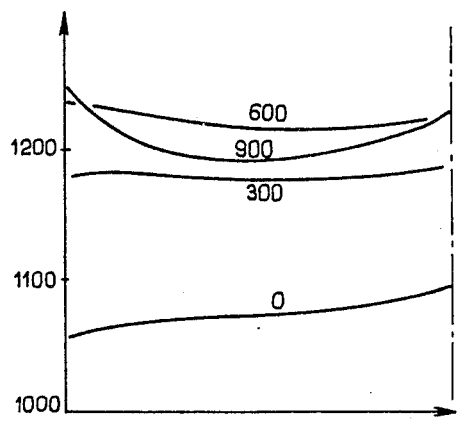
FIGS. 5a and 5b show the variations in temperature in the width of the tank at different levels for two distinct regimens.
Figure 5B:
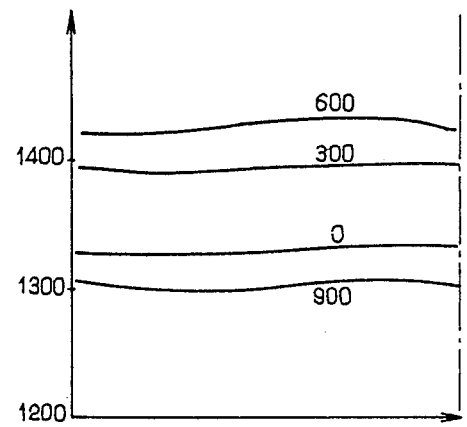

FIG. 5a shows the evolution of temperatures at different levels in the bath (0, 300, 600 and 900 mm above the floor), with the measurements being taken transversal to the tank in the vertical plane passing through point 11. The curves show good regularity in the temperatures taken at a same level, except for those corresponding to the surface which are more sensitive to local variations resulting from the convection currents close to the electrodes. The difference even in this case remains limited to approximately 50° C.

Graph 5a shows a draft of 1 ton/m² per day. Graph 5b is similar in nature but corresponds to a draft of 2.5 tons/m² per day. In this latter case, a general increase in temperature can be noted at all levels including that of the floor. The temperature gradient between the floor and the hottest level is not as large as in the preceding case. It covers approximately 100° C. The fact that the temperature of the zone in immediate contact with the composition is the least hot is due to the size of the heat losses at that level (which losses are all the more substantial when the temperature is situated higher).

In view of these results, a systematic study was carried out of the maximum temperatures of the floor as a function of the draft. This study was carried out simultaneously on the furnace in accordance with the invention (II) and on the similar furnace in which the electrodes are implanted in the floor (I).

These measurements were taken for the production of a glass from conventional raw materials, in particular calcined dolomite and 10% by weight of cullet.

| $SiO_2$ | 64.55 | $Na_2O$ | 15.60 |
|---|---|---|---|
| $Al_2O_3$ | 3.35 | $K_2O$ | 1.35 |
| CaO | 7.25 | $B_2O_3$ | 3.60 |
| MgO | 3.00 | F | 0.60 |

This type of glass is used particularly for the production of insulating fibers.

Figure 6:
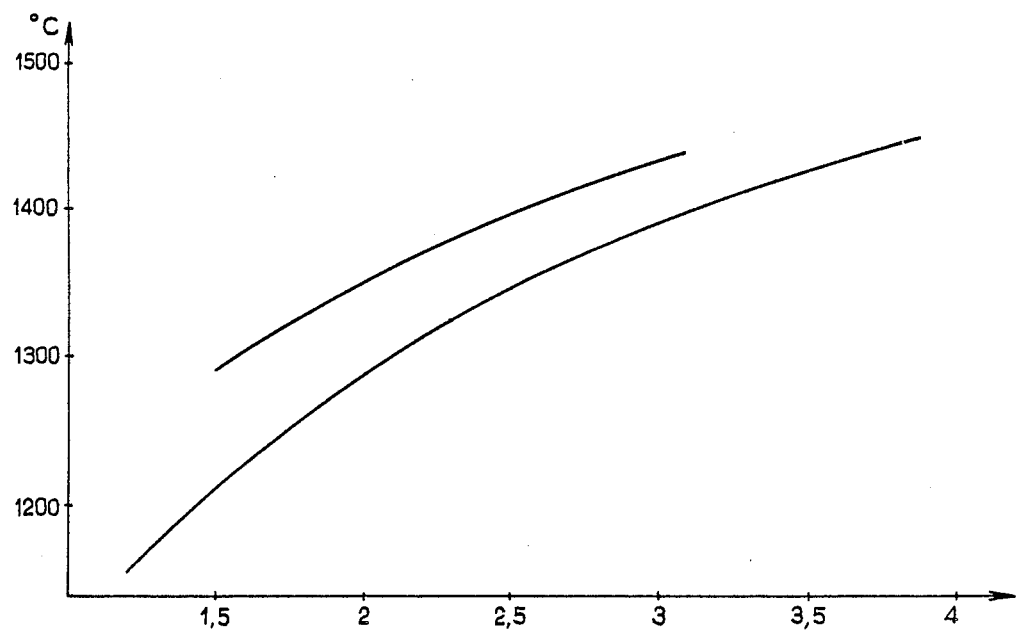
FIG. 6 is a graph indicating the temperature at the floor level as a function of the draft on a furnace in accordance with the invention and on the furnace with electrodes arranged on the floor.

The results are reproduced in FIG. 6. In both cases, they show a simultaneous increase in the temperature and in the draft. At all drafts, the temperatures of the furnace in accordance with the invention are lower than those of the furnace with electrodes on the floor. While the difference in temperature noted in favor of the furnace in accordance with the invention becomes higher when the draft is lower there still remains about 50° C. for drafts close to 3 tons/m² per day. This difference remains very considerable for the long life of the refractories. This advantage can be translated in a different manner. If, in effect, it is considered that acceptable wear of the refractories is a function of a certain temperature which must not be exceeded, by using a furnace in accordance with the invention, it can be seen that it is possible to achieve drafts which are out of the question for furnaces with electrodes on the floor. For example, for silico-soda-lime glasses of the above-indicated type in the furnaces in accordance with the invention and for a draft equal to or greater than 2.5 tons/m² per day, the temperature of the floor can be maintained at less than 1400° C.

Figure 7:
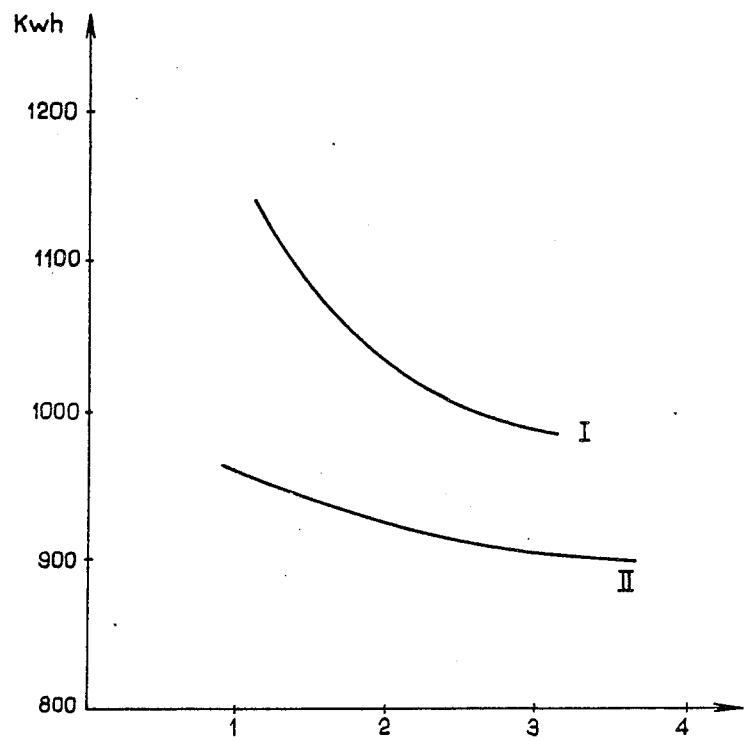
FIG. 7 is a graph showing the energy consumption as a function of the draft for the two types of furnaces considered with respect to FIG. 6.

The furnaces in accordance with the invention are further remarkable for their relatively low specific consumption. This consumption can be explained, at least in part, by the above noted lower temperatures which cause a reduction in heat losses. This mechanism is not, however, the only one to play a part in the determination of the consumption as is shows by the curves of FIG. 7 which were prepared for the two previously compared furnaces. In effect, the specific consumption decreases in both cases when the draft increases, while the temperature increases as indicated in FIG. 6. Nevertheless, in the case of the invention (II), for the melting of the same raw materials under the same conditions, a specific consumption is noted which is less than approximately 10 to 15% in accordance with the temperature. The difference noted becomes greater as the draft is reduced. Therefore, for a regimen of at least 1 ton/m² per day, the specific consumption for melting the silico-soda-lime glasses in question does not exceed 1000 kWh per ton.

Remarkably, the furnace in accordance with the invention has a specific consumption which varies little as a function of the draft. This "flexibility" in use combines with that noted above with regard to the possibility of working at a higher draft.

To achieve the indicated performances, it is necessary for the bath to be uniformly covered with raw materials forming an insulating layer. Consequently the distribution of these raw materials must cover the entire surface of the tank. Techniques providing such distribution are known and widely used in the electrical melting furnaces in which the electrodes are implanted on the floor. In particular, they include a continuously supplied belt conveyer, whose end which discharges the raw materials is led by a series of combined translation movements to sweep the entire surface. They also include devices in which the supply is simultaneously carried out over the entire width of the tank, with the device also moving translatably in order to cover the entire length of the tank.

Figure 8:
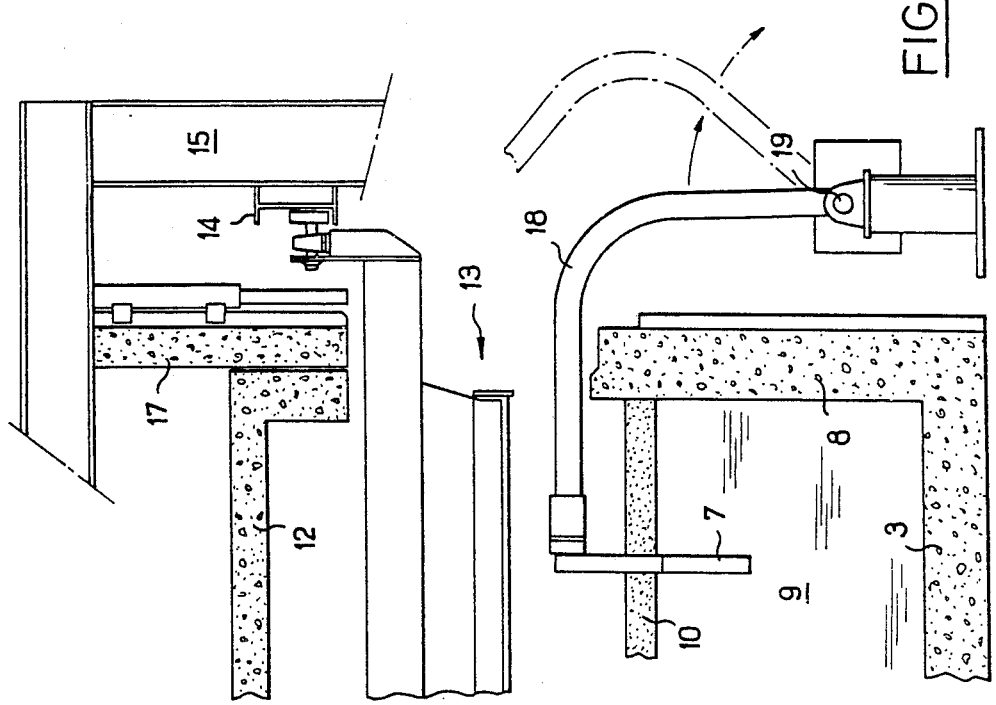
FIG. 8 is a schematic cross-section of an arrangement in accordance with the invention of an electrode and its support.

When the distribution is "punctual" or "linear", the distribution components must be able to move freely over the tank. With plunging electrodes, therefore, it must be ensured that they do not create an obstacle to this movement. FIG. 8 shows a method for arranging a furnace in accordance with the invention which complies with these conditions.

The furnace of FIG. 8 is only shown in part. The refractory tank composed of floor 3 and lateral walls 8 is represented schematically. Above the tank, the refractory roof 12 is suspended from a partially shown metal housing which overlaps the furnace.

The furnace supply is provided by a linear type distributor 13 which extends over the entire width of the tank. This distributor 13 moves by rolling on a rail 14 suspended from the housing shown very partially by vertical beam 15.

FIG. 9 schematically shows the movement undertaken by the distributor. In position A, distributor is loaded with raw materials from hopper 16 which is situated at one end of the tank and on the outside of the furnace chamber. Once the loading is carried out the distributor is brought over the tank. At position B the distribution is started. This mechanism continuously releases predetermined quantities of composition over the entire width of the tank. Distributor 13 moves uniformly up to position which corresponds to the end of the tank. Throughout its path and at regular intervals the distributor discharges the composition. Distributor 13 is then returned to position A. The distribution can take place solely on the forward path or on both the forward and return paths. During the movement of the distributor 13, hopper 16 which can be continuously supplied by any known means, and in particular by a conveyer belt, is reloaded. A new cycle begins.

The method of supply which has just been described requires that the passage of the device between the tank and the roof be left free. Only the end of the furnace opposite the one on the side of which hopper 16 is located can be closed by refractories. In accordance with the invention, however, movable refractory walls are provided, such as the one shown in at 17 on the three open sides of the furnace. These walls 17, when they are lowered until they rest on the lateral walls 8 of the tank, enable the bath to be insulated from the surrounding atmosphere. This arrangement is adopted when the furnace is placed in a "reduced output" condition and it is no longer necessary to supply it. By enclosing it, considerable heat loss is prevented and the bath can remain without the input of external energy for several hours.

The lowering of the movable walls 17 is ordinarily carried out after the electrodes 7 have been raised, as indicated below. However, it is also possible to provide notches in walls 17 corresponding to the location of the electrode support arms 18. The furnace chamber can therefore be practically closed whilst maintaining the electrodes in place. This arrangement consequently provides the necessary input of heat to maintain the furnace in a reduced output condition for prolonged periods.

The type of distributor 13 described above is preferred insofar as the space it takes up is practically limited to the furnace itself. It is particularly useful when the working of the invention is carried out during the conversion of a fossil fuel furnace to an electrical furnace. In the case of furnaces with burners, in effect, the placing of the composition into the furnace is ordinarily carried in a punctual manner at one end of the tank. Consequently, there are no free spaces provided around the furnace which enable the implantation of cumbersome supply means.

When the questions of space are not posed, other supply means can be envisaged and in particular those comprising a belt conveyer which is movable above the tank. In this case, the conveyer is ordinarily arranged on one side of the tank and its length is sufficient to enable it to extend to the other side of the tank during its movement. However, when the conveyer is in the "retracted" position, that is when its end is situated along the closest edge of the tank, the conveyer must be able to project out of the furnace by at least the entire width of the tank.

Whatever the means of supply selected, it is arranged over the electrodes and electrode carriers, as show in particular in FIG. 8. The distribution is carried out uniformly without taking account of these components on the fall trajectory of the composition. In practice, the electrodes and their supports have a sufficiently small cross-section so as to not impede good distribution. In addition, to prevent the accumulation of composition on arms 18, it is preferable to provide them with a round profile. For example, arms having a cylindrical cross-section will be used.

For modifications in operation requiring a change of electrodes or even for placing the furnace in a state of reduced output, it is preferable to be able to remove the electrode from the molten bath. FIG. 8 further shows a particularly simple assembly enabling this operation. In the method shown, the electrode is fixed to the end of an arm 18 which, as will be seen below, contains all the electrical and cooling fluid conduits.

Arm 18 is articulated at 19 on an axis enabling the pivoting of the assembly of the arm and the electrode outside the furnace. To do this, the shape of the arm and the position of the articulation point are selected as a function of the space available between the upper edge of the lateral walls 8 and the refractories arranged above the tank. This arrangement is even simpler to apply when the furnace has relatively small dimensions. Over a certain length of arm 18, it is not possible to pivot it. For the same reason, it is preferable in the embodiment of the furnace corresponding to FIGS. 1 and 2, to make it such that the arms supporting the electrodes are placed three on one side of the furnace and three on the other side. Nevertheless, other arrangements enabling the extraction of the electrodes and their supports are foreseeable which provide the passage of the support arms on a single side of the furnace. In all cases, these arrangements which can, for example, necessitate the use of arms which are movable both in rotation and in translation, must be used when more, than two rows of electrodes are present in the furnace.

The mobility of the electrode support in a horizontal place is moreover necessary when it is desired to modify the position of the electrodes in relation to one another for specific methods of operation. This mobility can be provided by conventional means, for example by placing the electrode supporting assembly 19 on a movable cradle or by means of a telescopic support 18.

One peculiarity of the methods used in accordance with the invention resides in the fact that the depth of immersion of the electrode is adjustable. In prior art propositions, systems are also encountered which propose a modification of the immersion. However, this modification ordinarily results from a movement of the body of the electrode itself in a complex assembly which acts as a support therefor, or even by moving the support itself.

The second solution is not satisfactory for the following reasons. The electrodes used in the electrical melting of the glass are made of molybdenum and their supports are ordinarily made of refractory steel. To prevent the oxidation in air of the molybdenum, the electrode-support connection is located under the level of the bath in fusion, such that the molybdenum is immersed and therefore sheltered from oxidation on contact with the atmosphere. However, the immersion of the support is limited to the strict minimum to prevent too much wear at this same level, and to further limit such wear, the end of said support is submitted to intensive cooling. It is therefore not foreseeable to adjust the depth of immersion from the depth of the support. The support must keep a constant position with regard to the surface of the molten bath.

With regard to the first solution, that is the movement of the electrode in a support sheath, it necessitates mechanisms which, in view of the arrangement of the supports in accordance with the invention, would necessarily be on the part of the support placed in the furnace chamber. This would require an increase in the size of the support. It has been seen that in order to obtain good distribution of the composition it is desirable for the support to take up as little space as possible. This solution therefore is not desirable. In addition, the placing of a adjustment mechanism in the furnace chamber and, consequently, the restrictions and oxidations to which said mechanism, even if simple, is subjected, do not promote its long life.

Figure 10:
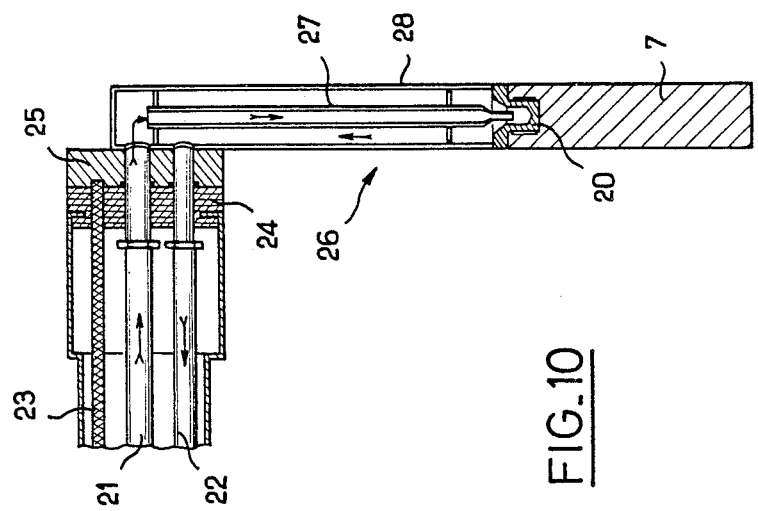
FIG. 10 is a partial cross-section of an embodiment of the electrode support.

In accordance with the invention, therefore, it is provided to adjust the length of the immersed electrode by selecting the appropriate electrode body. The replacement of one electrode with another is a relatively simple operation in the preferred embodiments. The pivoting of arm 18 makes the electrode body immediately accessible. Fixing same to the support can be relatively simple, as is shown in FIG. 10. It can particularly be a matter of screwing the body of the electrode 7 on the corresponding threaded end 20 of the support.

In the embodiment of FIG. 10, the electrode support comprises two parts. The first is composed of the arm 18, in which in particular channels 21, 22 are arranged for the circulation of the cooling liquid. Arm 18 also supports an electric cable 23. Channels 21, 22 and the cable are fixed on the insulating plate 24 on which is applied a corresponding conductive plate 25 which is connected to the electrode support 26.

Support 26 is composed of two cylindrical concentric tubes organizing a circulation of the cooling liquid up to end 20 which bears the electrode. To fully protect the support connection 26 of the electrode body 7, the interior tube 27 is preferably extended into the threaded plug 20 which closes the end of exterior tube 28.

In this embodiment, the connection between the arm 18 and the support 26 is situated deeply inside the furnace. In other words, all the connections for the cooling liquid circulation conduits 21, 22 or for the electric cable are subjected to high temperatures. In practice, it is preferable to make it such that said connections are placed outside the furnace or at least at the level of the walls thereof.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. The method of electrically melting a vitrifiable composition in a melting tank, comprising the steps of:
   (1) placing the vitrifiable composition in the melting tank; and
   (2) melting the vitrifiable composition by means of a plurality of vertically adjustable plunging electrodes in which energy is dissipated by a Joule effect in the resulting molten mass; and
   wherein the distance separating said electrodes from the closest lateral wall of said melting tank is at least half of the distance separating two adjacent electrodes and wherein the position of the level of the maximum temperature is regulated by the depth of immersion of the electrodes.

2. The method of claim 1, wherein the vitrifiable composition is continuously applied in a uniform layer on the surface of said molten mass.

3. The method of claim 1, wherein the depth of said molten mass is at least 500 mm.

4. The method of claim 1, wherein said electrodes are immersed to a depth which does not exceed ¾ of the depth of said molten mass.

5. The method of claim 4, wherein said electrodes are immersed to a depth which does not exceed ½ of the depth of said molten mass.

6. The method of claim 1, wherein said vitrifiable composition is silico-soda-lime glass and wherein said method of electrically melting produces at least 2.5 tons of said glass per day per $m^2$ of said melting tank, and wherein the temperature at the floor of said melting tank is less than 1,400° C.

7. The method of claim 6, wherein the energy consumption per ton of silico-soda-lime glass produced is less than 1,000 kWh when at least 1 ton of glass per day per $m^2$ of said melting bath is produced.

8. An electric melting furnace for melting a vitrifiable composition, comprising:
   (1) a melting tank having an open top for containing a vitrifiable composition,
   (2) a plurality of vertically adjustable electrodes,
   (3) means for supporting said electrodes such that said supporting means can be positioned in a first position wherein said electrodes are vertically suspended in said tank, and in a second position such that said electrodes are positioned outside said tank, and
   (4) means for supplying electric current to said electrodes.

9. The furnace of claim 8, wherein said support means comprises a horizontal pivot axis outside said melting tank and a support arm connected to said electrode and pivotally attached to said pivot axis, whereby said electrode in said first position can be pivotally removed from said tank to said second position.

10. The furnace of claim 9, wherein said electrode is detachably connected to said support arm.

11. The furnace of claim 8, wherein said supporting means is translatably movable in a direction parallel to the length of said melting tank.

12. The furnace of claim 8, wherein said melting tank comprises a refractory material, and wherein said electrical supply means is capable of supplying triphased current to said electrodes.

13. The furnace of claim 12, wherein said electrodes are distributed in said tank in at least two rows of three electrodes, each of said electrodes in a single row being supplied by one of the three designated phases of said triphase current, with the distance separating two rows being approximately equal to the distance separating two adjacent electrodes in one row, and with the distance separating the refractory walls of said tank from the closest electrodes being at least ½ of the distance separating two adjacent electrodes.

14. The furnace of claim 13, wherein each of the electrodes in one row are supplied by each of the three designated phases R, S and T of said triphased current with the order of the phases of the electrodes in one row being R, S, T and the order of the phases of the electrodes in the adjacent row being reversed such that the two middle electrodes are in phase and the end electrodes of each row are on different phases.

15. The furnace of claim 8, wherein the depth of said vitreous composition in said melting tank is at least 500 mm.

16. The furnace of claim 8, further comprising a roof on said open top and wherein said electrodes and said supporting means may be moved from said first position under said roof to said second position through the sides of said tank without traversing said roof.

17. The furnace of claim 8, further comprising a means of supplying said vitrifiable composition to said melting tank.

18. The method of claim 17, wherein said supply means is situated above said electrodes and said support means and wherein said supply means is movable along said open top.

19. The furnace of claim 18, further comprising rails arranged along the length of said melting tank, and wherein said supply means is movable on said rails.

20. The furnace of claim 16, further comprising at least one movable vertical wall between said roof and said open top, whereby the space between said roof and said open top can be enclosed.

* * * * *